United States Patent [19]

Takeuchi et al.

[11] Patent Number: 5,279,900
[45] Date of Patent: Jan. 18, 1994

[54] BONDED STRUCTURE OF ALUMINUM ALLOY AND RUBBER AND MANUFACTURE PROCESS THEREFOR

[75] Inventors: Katsumasa Takeuchi; Hiroshi Yokoi; Hideyuki Imai, all of Inazawa, Japan

[73] Assignee: Toyoda Gosei Co., Ltd., Nishikasugai, Japan

[21] Appl. No.: 766,395

[22] Filed: Sep. 27, 1991

[30] Foreign Application Priority Data

Sep. 29, 1990 [JP] Japan ................................ 2-262770
Sep. 29, 1990 [JP] Japan ................................ 2-262771
Sep. 29, 1990 [JP] Japan ................................ 2-262772

[51] Int. Cl.$^5$ ..................... B32B 15/06; B29C 47/00
[52] U.S. Cl. .................................. 428/462; 156/245; 428/465; 428/492
[58] Field of Search ............ 428/462, 492, 465, 472.2, 428/457

[56] References Cited

U.S. PATENT DOCUMENTS

5,063,098 11/1991 Niwa et al. ..................... 428/462 X

Primary Examiner—Thomas J. Herbert, Jr.
Attorney, Agent, or Firm—Cushman, Darby & Cushman

[57] ABSTRACT

A bonded structure 1 including an aluminum alloy plate 3 and a rubber 7 of vibration proof rubber adhering to each other with an adhesive wherein the aluminum alloy plate 3 includes aluminum alloy containing no more than 12% by weight of silicon and no more than 2.2% by weight of copper and the application of such aluminum alloy to the bonded structure 1 decreases the total weight of the structure 1 and improves both corrosion resistance and adhesiveness under corrosive conditions wherein the bonded structure is favorably applied to damper pulleys and shock-absorbing body mounts of vehicles.

3 Claims, 4 Drawing Sheets

BONDED STRUCTURE OF ALUMINUM ALLOY AND RUBBER AND MANUFACTURE PROCESS THEREFOR

BACKGROUND OF THE INVENTION

1. Field of the Invention

The present invention relates to a bonded structure of aluminum alloy and rubber with adhesive and to the manufacturing process therefor.

2. Description of Related Art

Bonded structures generally include a steel base and rubber adhering to the base. Typical examples of bonded structures are damper pulleys and shock-absorbing body mounts of vehicles. A damper pulley fixed to a crank shaft of an engine transmits a driving force to auxiliary equipment like a generator via a belt. A shock-absorbing body mount attached between a suspension frame and a body reduces vibration transmitted from wheels to the body. Aluminum alloy has recently been used as a new base material for such bonded structures because of its lightness in weight.

Bonded structures for vehicles are required to have sufficient durability since they may be used under corrosive conditions, for example, they may be exposed to sea water in coastal zones or to snow-melting salt in cold districts. Namely, a joint between the aluminum alloy and the rubber in bonded structures should have extremely high corrosion resistance and adhesiveness.

SUMMARY OF THE INVENTION

An object of the present invention is to provide a bonded structure which includes an aluminum alloy maintaining high adhesiveness and excellent corrosion resistance under corrosive conditions. A further object is to provide a method for manufacturing the bonded structure.

The present invention is directed to a bonded structure comprising:

an aluminum alloy member comprising aluminum alloy containing no more than 12% by weight of silicon and no more than 2.2% by weight of copper; and a rubber member adhering and bonded to the aluminum alloy member with an adhesive.

Preferably the aluminum alloy has a value y of at least 100 defined by the equation:

$$y = -428 + 23.5/[Si] + 30/[Cu] + 0.075[Al]^2$$

wherein [Si], [Cu], and [Al] denote percent by weight concentrations of silicon, copper, and aluminum, respectively.

In the preferred embodiments, the rubber member is made of vibration proof rubber.

One of the embodiments of the bonded structure is a disk damper, wherein the aluminum alloy member is an aluminum alloy disk connectible to a shaft rotationally driven by an engine, and the rubber member is fixed to the aluminum alloy disk with an adhesive.

Another embodiment of the bonded structure is a shock-absorbing body mount attachable between a suspension frame for supporting wheels and a body of a vehicle, wherein the aluminum alloy member is an inner cylinder of the body mount, and the rubber member is fixed to the outer surface of the inner cylinder with the adhesive.

The aluminum alloy of the bonded structure according to the present invention prevents the generation of a localized cell due to the segregation of silicon or copper. Accordingly the aluminum alloy member maintains sufficient corrosion resistance and improved adhesiveness to the rubber member under corrosive conditions.

These and other objects, features, aspects and advantages of the present invention will become more apparent from the following detailed description of the present invention when taken in conjunction with the accompanying drawings.

DESCRIPTION OF THE PREFERRED EMBODIMENTS

(I) Basic Bonded Structure

Figure 1:
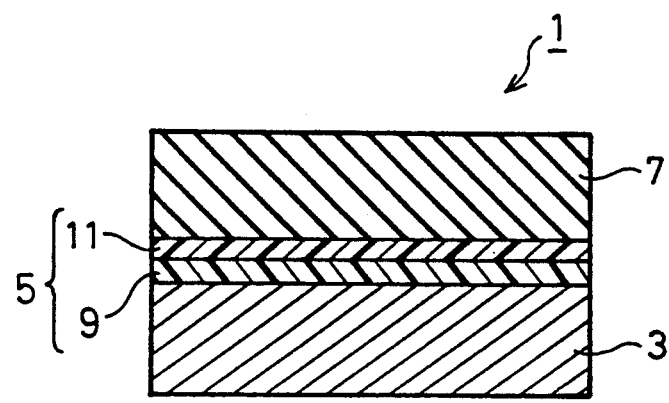
FIG. 1 is a cross sectional view of a bonded structure embodying the present invention.

FIG. 1 is a schematic cross sectional view which illustrates an embodiment of a bonded structure of the present invention. A bonded structure 1 includes an aluminum alloy 3 and a rubber 7 adhering to the aluminum alloy 3 by means of an adhesive layer 5. The adhesive layer 5 includes a lower-side adhesive coat 9 in contact with the aluminum alloy 3 and an upper-side adhesive coat 11 in contact with the rubber 7.

The aluminum alloy 3 is prepared in the first manufacturing step of the bonded structure. The aluminum alloy 3 contains no more than 12% by weight of silicon and no more than 2.2% by weight of copper. The aluminum alloy 3 may further contain toughness improving elements, for example, Fe, Mn, Mg, Zn, Ni, Ti, Pb, Sn, and V up to a concentration at which the adhesiveness of the aluminum alloy under corrosive conditions is no longer maintained.

So long as the aluminum alloy 3 has the structure stated above, it can be manufactured by any known method, for example, pressure die-casting, casting, or extrusion.

The surface of the aluminum alloy 3 is then degreased, and is roughened by abrasive blasting.

Plural layers of adhesives are then coated on the aluminum alloy 3. For example, the lower-side adhesive coat 9, which adheres well to the aluminum alloy, and the upper-side adhesive coat 11, which adheres well to the rubber, are successively applied onto the aluminum alloy 3.

The adhesive material for the lower coat 9 can be chosen from known urethane, epoxy, or acrylic adhesives, but phenol resin adhesives are preferable. When a phenol resin adhesive is applied as the lower adhesive coat 9, it can further contain chlorinated rubber, chlorinated polyethylene, chlorinated polypropylene, chlorinated (polyethylene-polypropylene) polymer, chloroprene rubber, or vinyl chloride elastomers for improving adhesiveness.

The adhesive material for the upper coat 11 can be any known rubber adhesive, but adhesives containing halogenated elastomers are preferable.

Although the adhesive layer 5 of this embodiment usually includes both of the two adhesive coats 9 and 11, alternatively, it can include only one of the two adhesive coats.

The aluminum alloy 3 is set in a mold (not shown), and rubber is then injected into a cavity of the mold. The mold is then heated to an elevated temperature and for a time period sufficient for vulcanization of the rubber. Here the aluminum alloy 3 adheres to the rubber 7 by means of the adhesive layer 5.

The rubber 7 can be natural rubber (NR) or synthetic rubber including chlorinated butyl rubber (Cl-IIR), chloroprene rubber (CR), chlorosulfonated polyethylene (CSM), stylene-butadiene rubber (SBR), acrylonitrilebutadiene rubber (NBR), ethylene-propylene-diene copolymerized rubber (EPDM), and ethylene-propylene copolymerized rubber (EPM).

The rubber 7 can be formed into a desired shape by any known method such as casting, injection molding, or transfer molding. In the embodiment, the adhering of the rubber 7 to the aluminum alloy 3 is simultaneously executed with the vulcanizing thereof. The adhesion can, however, be implemented separately; the rubber 7 previously vulcanized or unvulcanized can be bonded to the aluminum alloy 3 by applying pressure and heating.

An evaluation test was conducted to examine adhesiveness of the bonded structure 1 of the embodiment under normal and corrosive conditions, respectively.

Figure 2:
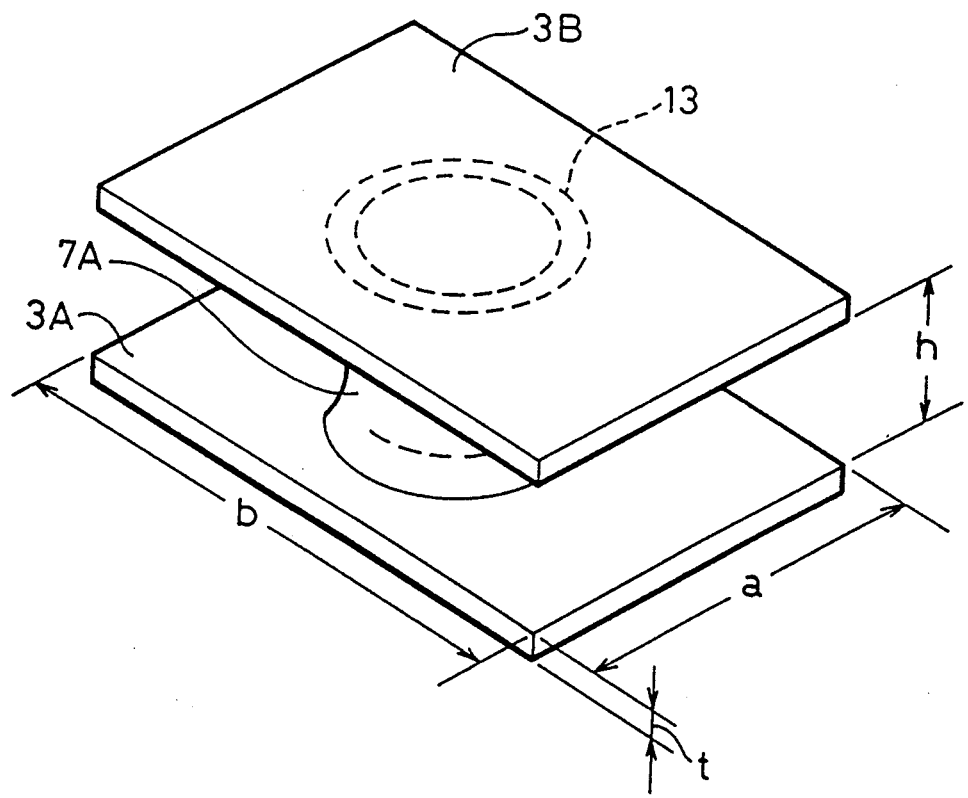
FIG. 2 is a perspective view illustrating a sample of the embodiment used for an evaluation test.

FIG. 2 shows a sample examined, which includes aluminum alloy plates 3A and 3B, and a rubber 7A inserted between the plates.

The aluminum alloy plates 3A and 3B were 25 mm in length a, 35 mm in width b, and 3.2 mm in thickness t. The height h of the rubber 7A was 10 mm. The area of adhesion between the rubber 7A and the aluminum alloy plates 3A or 3B was 3.8 cm$^2$.

Nine pairs of the aluminum alloy plates 3A and 3B were prepared, which had various compositions as shown in Table 1. Examples No. 1 and No. 2 and control example No. 8 were manufactured by pressure die-casting, examples No. 3, No. 4, and No. 5 and control example No. 9 by casting, and examples No. 6 and No. 7 by extrusion.

The faces of the aluminum alloy members 3A and 3B were degreased with a solvent or water, and roughened by abrasive blasting.

A lower-side adhesive coat and an upper-side adhesive coat were successively applied to both of the aluminum alloy plates 3A and 3B. The lower-side coat was phenol resin adhesive containing halogenated elastomers sold under the trademark Chemlok 205 by Lord, U.S.; the adhesive was sprayed and dried at 50° C. for 10 minutes. The upper-side coat was halogenated elastomer adhesive for rubber sold under the trademark Chemlok 220 by Lord, U.S.; the adhesive was sprayed and dried at 50° C. for 10 minutes.

Both the adhesives were applied with a thickness of 10 micrometers.

Figure 3:
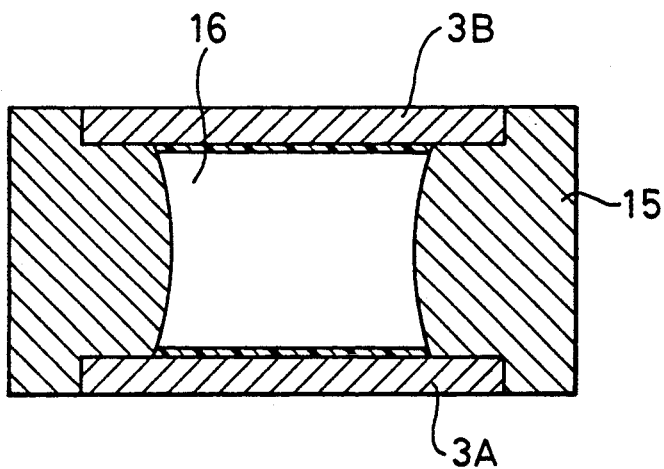
FIG. 3 is a cross sectional view illustrating a mold for manufacturing the sample of FIG. 2.

After the aluminum alloy plates 3A and 3B were set in a mold 15 as shown in FIG. 3, natural rubber was injected into a cavity 16 of the mold 15 and heated at 150° C. for half an hour to vulcanize the rubber thereof. Here the upper and lower surfaces of the rubber 7A adhered to the aluminum alloy plates 3A and 3B, respectively, via adhesive layers (not shown in FIG. 3). The composition of the natural rubber used was as follows:

| Constituents | Amount (Parts by Weight) |
| --- | --- |
| Natural rubber (NR) | 100. |
| HAF carbon black | 60. |
| Naphthene process oil | 15. |
| Zinc oxide | 5. |
| Paraffin wax | 1. |
| Antioxidant 1 | 1. |
| Antioxidant 2 | 0.5 |
| Vulcanization accelerator | 1. |
| Sulfur | 1.5 |

The paraffin wax used was sold under the trademark Sunnoc N by Ouchi Shinko Chemical Industries. The antioxidant 1 was poly(2,2,4-trimethyl-1,2-dihydroquinoline) sold under the trademark Nocrac-224, the antioxidant 2 was N-phenyl-N-isopropyl-p-phenylenediamine sold under the trademark Nocrac-810Na, and the vulcanization accelerator was N-cyclohexyl-2-benzothiazolyl sulfonamide sold under the trademark Nocceler-CZ, all by Ouchi Shinko Chemical Industries.

Results of the evaluation test for adhesiveness under normal and corrosive conditions are as follows:

a) Initial Adhesiveness Test

The samples prepared as above were pulled at a tensile speed of 25 mm/min with a universal tension tester.

The rubber 7A was not peeled off the aluminum alloy plates 3A and 3B but was fractured for all the samples. This result shows that silicon and copper components in aluminum alloy do not affect the initial adhesiveness of the samples.

b) Adhesiveness under Corrosive Conditions

The adhesiveness of the samples under corrosive conditions was tested with the rubber 7A subjected to a tension of 10% according to the Salt Spray test JIS Z2371 an English translation of which is attached as an Appendix and incorporated hereinto by reference. Here the adhesiveness is expressed as the number of days before the rubber 7A peeled off the aluminum alloy 3A. The test was ended after 600 days.

A cut 13 was made around the peripheral edge of the adhesive layer on one side of the rubber 7A of each sample to make an adhesion area of 1.1 cm$^2$.

All the examples No. 1 through No. 7, containing no more than 12% by weight of silicon and no more than 2.2% by weight of copper, have met the criteria; the rubber did not peel off over a period of 100 days or longer. In contrast, both the control examples No. 8, containing more than 2.2% by weight of copper, and No. 9, containing more than 12% by weight of silicon, failed to pass the test as seen in Table 1. Example No. 8 peeled at 70 days, and Example No. 9 peeled at 80 days.

The number of days before peeling off y is given by the following empirical Equation (1), which was obtained by multiple regression analysis based on the concentrations of Si, Cu, and Al of the nine samples:

$$y = -428 + 23.5/[Si] + 30/[Cu] + 0.075[Al] \tag{1}$$

wherein [Si], [Cu], and [Al] denote concentrations (percent by weight) of silicon, copper, and aluminum, respectively.

Equation (1) is applicable to respective ranges of 0.079 through 18.15% by weight of silicon, 0.05 through 3.5% by weight of copper, and 77.11 through 97.63% by weight of aluminum.

When the adhesiveness of bonded structures under corrosive conditions is estimated from Equation (1) with the measured concentrations of Si and Cu in aluminum alloy, it is found that bonded structures according to the above-described embodiment have improved reliability.

TABLE 1

| SAMPLES No. | PROCESS | COMPOSITION OF aluminum alloy | | | | | | |
|---|---|---|---|---|---|---|---|---|
| | | Si | Cu | Fe | Mn | Mg | Zn | Ni |
| Examples | | | | | | | | |
| 1 | Die-casting | 9.5 | 0.6 | 0.67 | 0.09 | 0.49 | 0.33 | 0.03 |
| 2 | Die-casting | 0.65 | 0.06 | 0.73 | 0.36 | 3.8 | 0.04 | 0.01 |
| 3 | Casting | 7.13 | 0.14 | 0.47 | 0.19 | 0.38 | 0.04 | 0.02 |
| 4 | Casting | 5.99 | 0.05 | 0.168 | 0.023 | 0.347 | 0.021 | 0.018 |
| 5 | Casting | 4.99 | 2.15 | 0.166 | 0.026 | 0.093 | 0.007 | 0.019 |
| 6 | Extrusion | 0.648 | 0.08 | 0.086 | 0.02 | 1.5 | 0.007 | 0.002 |
| 7 | Extrusion | 0.079 | 0.173 | 0.085 | 0.02 | 1.5 | 0.5 | 0.008 |
| Control examples | | | | | | | | |
| 8 | Die-casting | 10.23 | 2.41 | 0.83 | 0.27 | 0.14 | 0.86 | 0.07 |
| 9 | Casting | 18.15 | 3.5 | 0.331 | 0.021 | 0.81 | 0.015 | 0.025 |

| SAMPLES No. | COMPOSITION | | | | | | SALT SPRAY | |
|---|---|---|---|---|---|---|---|---|
| | Ti | Pb | Sn | Cr | V | Al | RESULT (days) | |
| Examples | | | | | | | | |
| 1 | — | — | — | — | — | 88.29 | 100 | Good |
| 2 | — | — | — | — | — | 94.35 | 600 or more | Good |
| 3 | 0.03 | 0.01 | 0.01 | 0.01 | 0.01 | 91.56 | 600 | Good |
| 4 | 0.1 | 0.004 | 0.002 | 0.04 | — | 93.27 | 600 | Good |
| 5 | 0.108 | 0.005 | 0.004 | 0.002 | — | 92.43 | 175 | Good |
| 6 | 0.01 | — | — | 0.002 | 0.007 | 97.63 | 600 or more | Good |
| 7 | 0.015 | — | — | 0.003 | 0.015 | 97.60 | 600 or more | Good |
| Control examples | | | | | | | | |
| 8 | 0.04 | 0.01 | 0.01 | 0.08 | — | 85.05 | 70 | No good |
| 9 | 0.015 | 0.007 | 0.008 | 0.006 | — | 77.11 | 80 | No good |

(II) Damper Pulley

Figure 4:
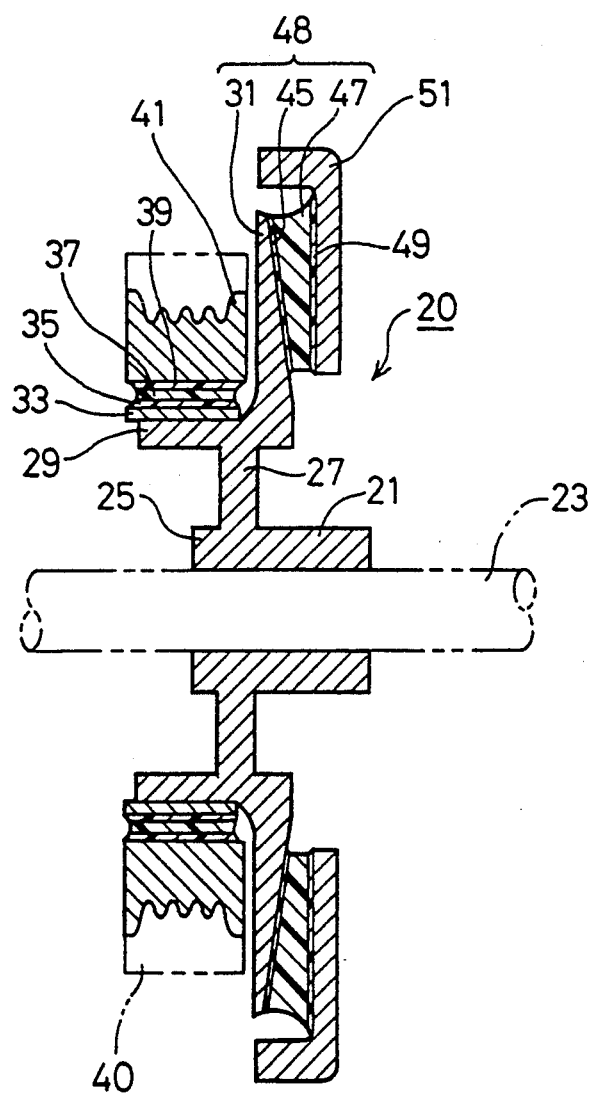
FIG. 4 is a cross sectional view of one embodiment of a damper pulley of present invention.

FIG. 4 is a cross sectional view of a damper pulley 20 including an embodiment of a bonded structure of the present invention.

The damper pulley 20 has a hub 21 with a cylinder portion 25 through which a crank shaft 23 passes. The hub 21 further integrally includes a support 27 extending outside from the hub 21, a pulley support 29 of a cylindrical shape formed outside the support 27, and a disk support 31 extending outside from the pulley support 29.

A pulley portion of the damper pulley 20 is formed on the pulley support 29 as follows: The pulley support 29 is engaged with a ring 33 at its outside surface. On the ring 33 are fixed an adhesive layer 35, a rubber 37, another adhesive layer 39, and a pulley 41 for a belt 40, in this order, each having a cylindrical shape.

A damper portion of the damper pulley 20 is formed on the disc support 31 as follows: A rubber 47 made of vibration proof rubber adheres to the side of the disk support 31 via an adhesive layer 45. The disk support 31, the adhesive layer 45 and the rubber 47 form a bonded structure 48. A disk 51 adheres to the rubber 47 via an adhesive layer 49.

The hub 21 is cast in aluminum alloy of such composition as sample No. 4 in Table 1. The rubber 47 is formed by extrusion molding of chloroprene rubber (CR). The adhesive layers 45 and 49 respectively include a lower-side coat of a phenol resin adhesive sold under the trademark Chemlok 205 by Lord, U.S., and an upper-side coat of a halogenated elastomer adhesive for rubber sold under the trademark Chemlok 220 by Lord, U.S.

The pulley 41 and the disk 51 are made of cast iron, the ring 33 of a steel tube, and the rubber 37 of a blend of natural rubber and stylene-butadiene rubber (NR/SBR). The adhesive layers 35 and 39 respectively include a lower-side coat of a phenol resin adhesive sold under the trademark Chemlok 205 by Lord, U.S., and an upper-side coat of a halogenated elastomer adhesive for rubber sold under the trademark Chemlok 252 by Lord, U.S.

In the damper pulley 20 thus constructed, a driving force is transmitted from an engine (not shown) through the crank shaft 23, the hub 21, the ring 33, the rubber 37, the pulley 41 to the belt 40. Inertia caused by the disk 51 adhering to the rubber 47 prevents unstable rotation and torsional vibration of the crank shaft 23.

In manufacturing the damper pulley 20, the hub 21 is first cast in aluminum alloy, and the disk 51 in iron. A lower-side adhesive coat and an upper-side adhesive coat are applied on the disk support 31 and the disk 51. The hub 21 and the disk 51 are then set in a mold (not shown). Rubber material is injected into a cavity of the mold and heated at 170° C. for ten minutes to vulcanize the material. While being formed between the hub 21 and the disk 51, the rubber 47 adheres to the hub 21 and to the disk 51.

Meanwhile, the pulley 41 is cast in iron, and a predetermined length of a steel tube is cut to form the ring 33. The pulley 41 and the ring 33 are then set in a mold (not shown). Rubber material is injected into a cavity of the mold and heated at 160° C. for ten minutes to vulcanize the material; this causes the rubber 37 to adhere to the ring 33 and the pulley 41 while being formed between them.

Then the ring 33, with the rubber 37 and the pulley 41 fixed thereon, is press fitted to the pulley support 29, thus forming the damper pulley 20.

The adhesiveness of the damper pulley 20 was tested under corrosive conditions.

After the damper pulley 20 was subjected to the salt spray according to JIS Z2371 over 150 days, the bonded structure 48 of the damper pulley 20 was pulled with a universal tension tester. The rubber 47 did not peel off but was fractured. This test showed that the bonded structure 48 maintained sufficient adhesiveness even under corrosive conditions.

Use of aluminum alloy according to the present invention for the hub 21 decreases the total weight of the bonded structure 48 and improves damping characteristics and adhesiveness under corrosive conditions.

Although the bonded structure 48 is applied to the disk damper pulley 20 in the embodiment described above, it may be applied to a disk damper without a pulley, that is, a disk damper having a hub, a rubber, and a disk.

Figure 5:
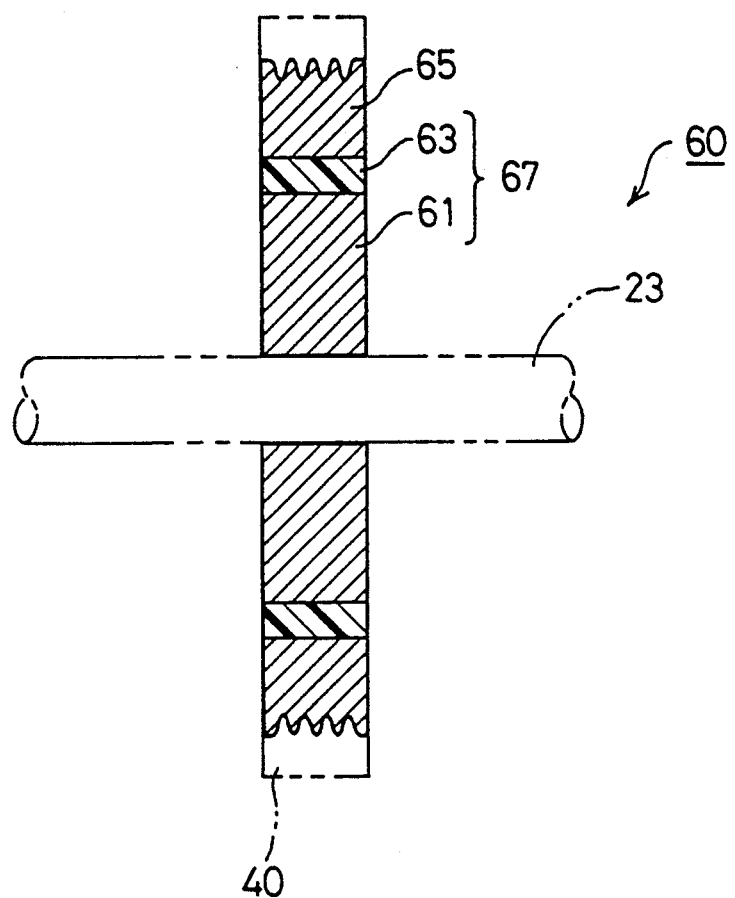
FIG. 5 is a cross sectional view showing another embodiment of a pulley of the present invention.

FIG. 5 shows a pulley 60 with another embodiment of a bonded structure of the invention. The pulley 60 includes a hub 61 of aluminum alloy engaged with the crank shaft 23, a rubber 63 adhering to the hub 61, and a pulley 65 adhering to the rubber 63 for mounting the belt 40. The hub 61 and the rubber 63 with adhesive layers constitute a bonded structure 67.

(III) Shock-absorbing Body Mount

Figure 6:
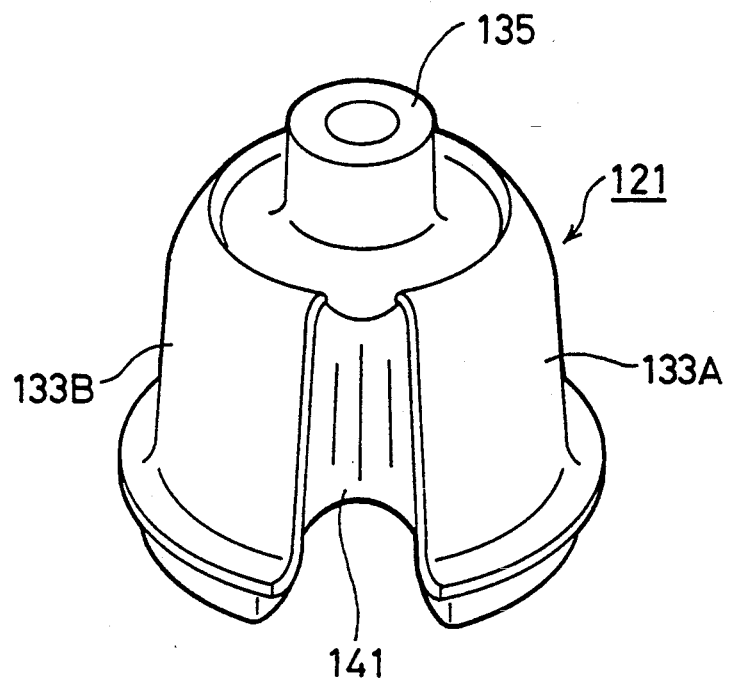
FIG. 6 is a perspective view of one embodiment of a shock-absorbing body mount embodying the present invention.
Figure 7:
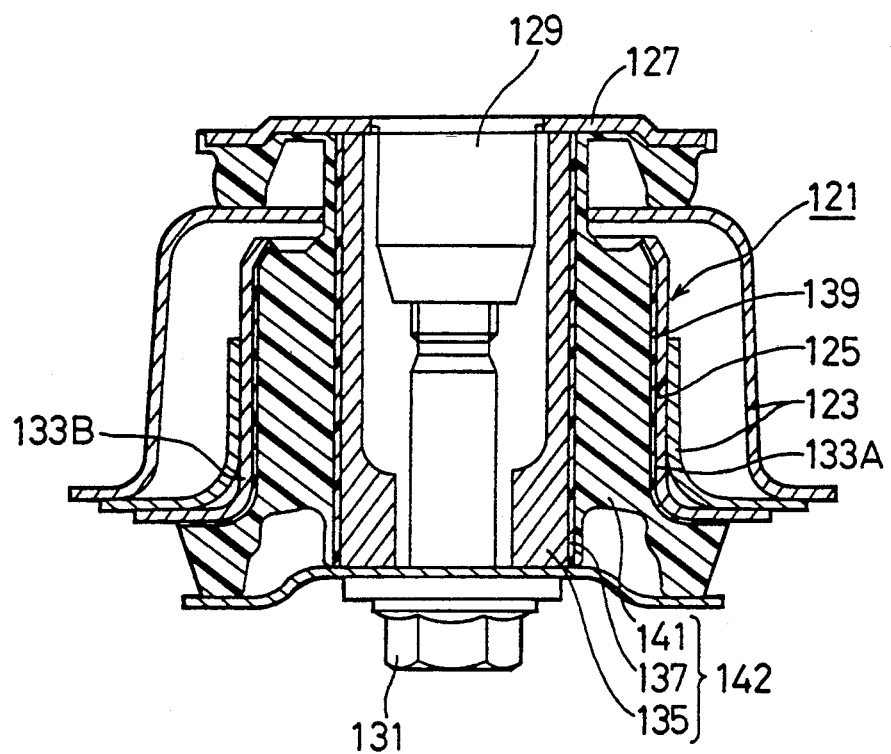
FIG. 7 is a cross sectional view illustrating the shock-absorbing body mount of FIG. 6 attached to between a suspension frame and a body.

FIG. 6 is a perspective view illustrating a shock-absorbing body mount 121, and FIG. 7 is a cross sectional view showing the body mount attached between a suspension frame and a body of a vehicle.

The shock-absorbing body mount 121 is engaged with a joint 125 of a suspension frame 123 for wheels and fixed to a body 127 with a nut 129 and a bolt 131. The shock-absorbing body mount 121 includes separated outer plates 133A and 133B, an inner cylinder 135 of aluminum alloy, and a rubber 141 of vibration proof rubber. The rubber 141 adheres to the outer plates 133A and 133B and to the inner cylinder 135 by means of an inner adhesive layer 137 and an outer adhesive layer 139, respectively. The inner cylinder 135, the inner adhesive layer 137, and the rubber 141 form a bonded structure 142.

The inner cylinder 135 of the bonded structure 142 is formed by extrusion molding of aluminum alloy of such composition as sample No. 6 in Table 1. The rubber 141 is formed by injection molding of natural rubber (NR). The inner adhesive layer 137 includes a lower-side coat of a phenol resin adhesive sold under the trademark Chemlok 205 by Lord, U.S., and an upper-side coat of a halogenated elastomer adhesive for rubber sold under the trademark Chemlok 220 by Lord, U.S.

In the shock-absorbing body mount 121 thus constructed, vibration from the suspension frame 123 passes through the joint 125 and the outer plates 133A and 133B, is damped by the rubber 141, and is transmitted through the inner cylinder 135 to the body 127.

Namely, the shock-absorbing body mount 121 of the embodiment absorbs the vibration.

In manufacturing the body mount, the outer plates 133A and 133B are prepared by pressing a steel plate and dividing the pressed plate into halves. The inner cylinder 135 is formed by extrusion molding and cutting of aluminum alloy. A lower-side adhesive coat and an upper-side adhesive coat are applied on the outer surface of the inner cylinder 135 and the inner surface of the outer plates 133A and 133B, respectively. The outer plates 133A and 133B and the inner cylinder 135 are then set in a mold (not shown). Natural rubber is injected into a cavity between the inner cylinder 135 and the outer plates 133A and 133B and heated at 160° C. for ten minutes to vulcanize, thus completing the shock-absorbing body mount 121.

The adhesiveness of the shock-absorbing body mount 121 was tested under corrosive conditions. After the body mount 121 was subjected to the salt spray according to JIS Z2371 over 150 days, the bonded structure 142 of the body mount 121 was pulled with a universal tension tester. The rubber 141 was not peeled off but was fractured. These results showed that the bonded structure 142 maintained sufficient adhesiveness even under corrosive conditions.

Use of aluminum alloy according to the present invention for the inner cylinder 135 decreases the total weight of the bonded structure 142 and improves adhesiveness under corrosive conditions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bonded structure comprising:
   an aluminum alloy member comprising aluminum alloy containing greater than 0% but no more than 12% by weight of silicon and containing greater than 0% but no more than 2.2% by weight of copper,
   a rubber member, and
   an intermediate adhesive layer bonding the rubber member to the aluminum alloy member.

2. A bonded structure in accordance with claim 1, wherein
   said aluminum alloy has a value y of at least 100 defined by the equation:

$$y = -428 + 23.5/[Si] + 30/[Cu] + 0.075[Al]^2$$

wherein [Si], [Cu], and [Al] denote percent by weight concentrations of silicon, copper, and aluminum, respectively.

3. A bonded structure in accordance with claim 2, wherein said rubber member is made of vibration proof rubber.

* * * * *